Sept. 18, 1945.　　　F. W. KNOWLES　　　2,385,140
PROCESS OF FREEZING FOOD
Filed Oct. 23, 1939
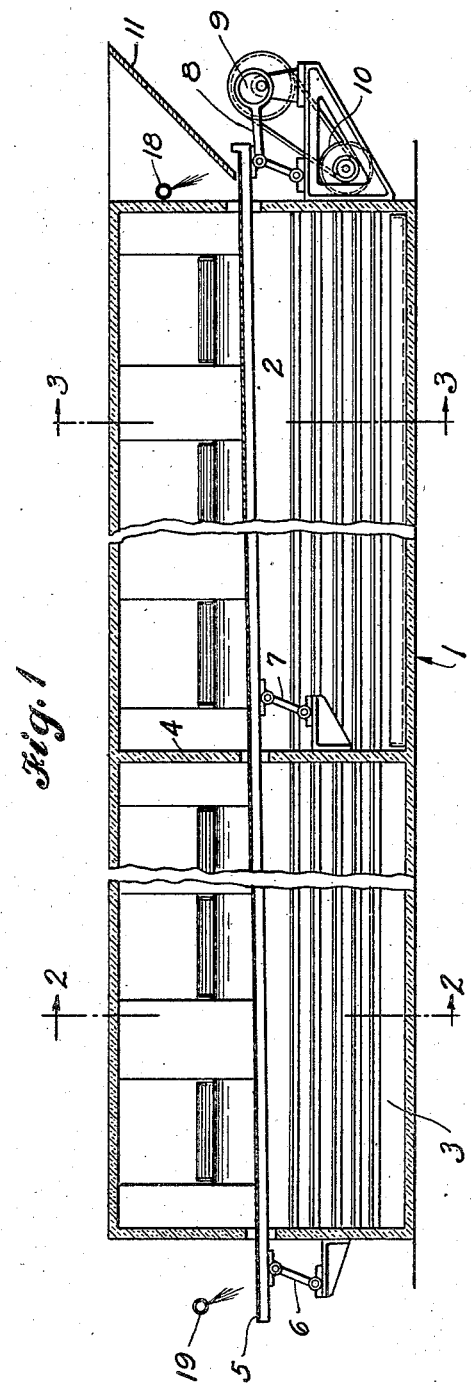
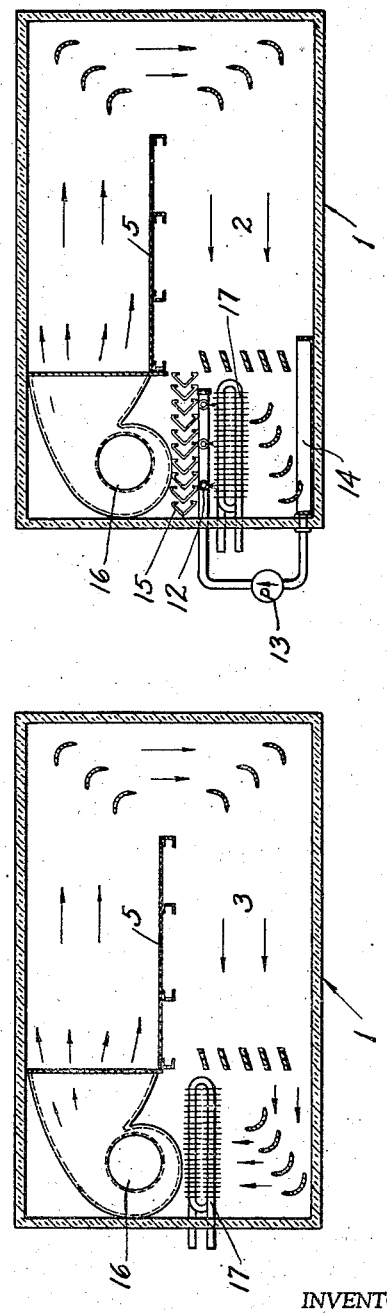
INVENTOR.
Frank W. Knowles
BY Paul Bliven
ATTORNEY.

Patented Sept. 18, 1945

2,385,140

UNITED STATES PATENT OFFICE 2,385,140

PROCESS OF FREEZING FOOD

Frank W. Knowles, Seattle, Wash., assignor to Beltice Corporation, Seattle, Wash., a corporation of Washington Application October 23, 1939, Serial No. 300,766

16 Claims. (Cl. 62—173)

Reference is made to my related co-pending application, Serial Number 225,429, filed August 17, 1938, for Freezer for peas and other products, now granted as Patent Number 2,300,229, October 27, 1942.

The present invention relates to the freezing of food stuffs, particularly vegetable foods, to effect their preservation.

At present foods are being frozen on trays placed on racks in refrigerated compartments, upon conveyor belts which are moved through refrigerated compartments, or in rotating refrigerated drums.

Prior to freezing, most foods go through washers and, hence, have water on their surfaces when they go to the freezer. This water when frozen forms small pieces of ice on the food, and when the pieces of food are in contact with each other they freeze together, forming chunks of the food. Also, this water causes the food to freeze to the trays or conveyor upon which it is being frozen. Removal is often difficult and expensive. Also, in the present methods, this water is evaporated in large quantities from the surface of the food and deposited upon the refrigerating surface or coils. This increases the necessity for frequent defrostings and reduces materially the output of the plant. Also, the presence of ice only on part of the food surface, or unevenly distributed thereover, causes the heat of the food to be unevenly extracted over the surface, resulting in burning, or spotting, of the food.

It is an object of the present invention to remedy the above-mentioned difficulties.

It is another object of the present invention to increase the rate of freezing certain foods.

It is another object of the present invention to perfect an apparatus and a process which will form on the surface of the food, especially vegetables, a thin glaze, either of solidified water or other material, such as a sugar syrup.

Another object of the invention is to obtain a vegetable having a thin coating, or glaze, of ice or other frozen substance upon its surface.

Another object of the invention is to freeze foods in two stages—first, a prefreezing under a high humidity or a saturated condition and a temperature just under the freezing point, and, second, finish freezing under low humidity and lower temperatures.

Another object of the invention is to freeze large amounts of food at one time while it is being agitated so that each individual piece of the food is free to move independently of the others.

These objects are attained by agitating the food by means of a shaker, by adding to the surface of the food water, a sugar solution, or any other desired glazing material, and to solidify the glaze and while it is solidifying, maintaining the atmosphere surrounding the material in a saturated condition and at a temperature just below the freezing point of the glaze. This atmosphere may be air or other desired gases or gas. The atmosphere need not be fully saturated but should be in the dry saturated region. The saturating material may be water, alcohol, or other desired substances, which will reduce evaporation of the glazing material, its solvent, or vehicle from the food. When the glaze has set, the material is passed to a colder and dryer region where the freezing is continued and finished. Agitation of the material is continued during this final freezing.

The transfer of heat may be obtained by the circulation of the freezing atmosphere between refrigerating coils and the food. The shaker may be in the form of a flat plate or screen to which is imparted an oscillatory motion longitudinally thereof.

A shaker and auxiliary equipment constructed to perform the desired process and achieve the objects set forth above is illustrated in the drawing presented herewith, in which:

Figure 1 is a longitudinal section of the shaker and its housing.

Figure 2 is a section on the line 2—2 of Figure 1.

Figure 3 is a section on the line 3—3 of Figure 1.

In the device illustrated in the drawing, there is shown a housing 1 which is divided into two sections 2 and 3 by a division wall 4. Extending through the sections is a flat solid plate or screen 5. This plate is held rigid by any suitable framing. The plate is supported by short crank arms, such as 6 and 7, mounted in suitable pedestals. The plate is oscillated by a link 8 connecting the plate to an eccentric 9 driven by a motor 10. Food is fed to the shaker at the inlet end by a chute 11. The shaker may be inclined one to two degrees from the inlet to the outlet. It is also to be noted that the supporting cranks oscillate to the right of top center. This gives the material an upward and forward throw. The shaker may be made in any required length or made up of a tier of plates.

The construction of the two sections 2 and 3 is similar except for the provision in the first section of a humidifier. This humidifier and the other accessories are set in the air return passageway located alongside of the shaker tray housing. The humidifier comprises a brine spray from nozzles 12 which are supplied with brine by a pump 13. The pump takes the brine from a pan 14. Makeup brine may be supplied to the pan in any desired manner. Excess water is taken out of the air stream by an eliminator 15 set after the sprays in the air stream.

Air is circulated by a series of fans 16 placed in the housing. Refrigeration coils 17 placed in the air passageway provide the required refrigeration. The brine spray impinges upon these coils, and the excess is collected by the pan 14. The fans may be driven by any suitable means. Conventional refrigeration machinery may provide the refrigeration. The housing and air ducts are provided with suitable baffling, some of which is shown. The relative humidity may be controlled by the speed of the pump 13. However, it is most desirable that the atmosphere be saturated. Suitable insulation for the housing may be provided. A spray pipe 18 is provided at the entrance to the first section, and another 19 at the outlet of the second chamber 3.

The operation of the device for the freezing of peas is as follows:

The refrigeration is set in operation and the fans 16 are started. The temperature in the first section is reduced to around twenty-eight degrees Fahrenheit, and the air is given by the brine sprays 12 water vapor to place its vapor content in equilibrium with the sprays. This will also place the vapor in the dry saturated region as the difference between the equilibrium point and the dry saturated would probably be only five or six tenths of a millimeter of Hg, and not over one. The brine spraying on the refrigeration coils prevents their frosting. The temperature in the second section is reduced to around five degrees below zero. The shaker plate is set in oscillation by the motor 10. The frequency of the oscillations may be around three hundred per minute. The peas are fed down the chute 11 onto the shaker screen, 5, or plate. If the peas are just from the washers and blanchers it may not be necessary to add water to their surface, but if they are not wet then water should be added from the spray pipe 18. The action of the shaker plate will largely be to roll the peas therealong. There may be some unsupported vertical movement. The main object of the agitation is to allow each individual pea to move freely and independently of the other peas. This rolling or agitation evenly distributes the water over the surface of the individual pea where, under the influence of the freezing temperature, it solidifies in an even glaze on the surface of the food. The agitation of the peas also prevents their adhesion to one another and to the screen. The high humidity increases the heat capacity of the air stream, reduces the evaporation of water from the food, and aids in the formation of the glaze. The temperature is only low enough to effect the formation of the glaze. The inside of the pea is still unfrozen. In this condition the peas pass into the second section where the temperature is reduced to around five degrees below zero and the humidity is proportionately reduced, or even lower depending upon the action of the refrigerating coils in removing moisture. No effort is made in the second section to control the humidity. The peas will come out of the second section solidly frozen with a glaze of ice thereon. The peas will be free running; no chunks or ice particles or lumps will be present.

The spray pipe 18 may supply a syrup to the surface of the food when the device is used for freezing fruits requiring such for their proper preservation.

It is also possible to give the food a preliminary freezing in a relatively dry atmosphere, and on a shaker, such as shown by chamber 3, then to spray on the glaze and freeze it in a high humidity or saturated condition while the food is being agitated, such as shown by chamber 2, and then, depending upon the condition of the food, to give, if necessary, the food a final freezing by again using a chamber such as 3.

It is also possible to add successive coats of glaze to the food by spraying, as at 19, a glazing material on it as it comes from the second chamber 3, and then passing the food through another set of chambers such as 2 and 3. It will be obvious that the travel through the successive chambers may be more rapid because of the lower heat content of the food.

The formation of an unbroken glaze on the surface of food increases the preservative action of the freezing by preventing the access of oxygen and fungi to the surface thereof. The relatively high temperature in the prefreezer 2 and the high humidity as compared with the final freezer 3, aids in making the glaze clear instead of white or frosted, as would be the case if the temperature were at or below zero in the first freezing steps. Any frost that may form on the food either in the prefreezer or in the final freezer will be broken off by the agitation of the food and carried away by the air stream.

A large portion of the heat removed from the food is removed by contact with the surface of the metal tray. Inasmuch as this contact is being continually changed both with respect to the tray and to the food a better condition exists than when the food is stationary on a tray. The rolling of the food along the tray decreases or eliminates temperature gradients along the tray between food contact points. Also, this rolling means that the heat transfer to the tray takes place from all of the surface of the food and not from one point. This increases the overall rate of heat transfer and reduces the heat burns on the food. In fact, in the freezing of foods such as peas, heat burns have been entirely eliminated.

Other foods than peas may be frozen in the above described device. Such foods may be cut beans, cherries, blueberries, and in fact any fruit or vegetable which may be moved along by the action of the shaker. It is desirable that the food be of a size and shape which will roll as it moves so that all sides come into contact with the tray, and so as to have the glaze evenly distributed over the food's surface. Large fruits and vegetables may be cut to smaller sizes to obtain this free rolling and to decrease the freezing time. It is obvious that all or parts of the process may be used with other types of apparatus, as the two stage freezing may be associated with the ordinary tray racks or conveyors. Also, the agitation while freezing may be obtained by other means such as suspending the food in an air jet or jets.

As compared to stationary tray freezing, the present process reduces the time from three or four hours to fifteen or twenty minutes. Whereas, previously the coils had to be defrosted every four hours, now they will go three or four days, and then only those in the second compartment need defrosting. The food does not have burned spots, is bright in appearance, is not dried, keeps better, and is free flowing.

It is to be noted that the refrigerated air in passing over the top of and in under the bottom of the shaker plate removes any heat taken up by the plate from the food thereon. In some instances it may be desirable to confine the air flow to the bottom only of the plate or to have a differential between the speed of the air contacting the food and that contacting the bottom of the plate. By providing a separate air stream for refrigerating the plate apart from the direct contact of air with the food, the speed of the air may be greatly increased and, hence, the rate of heat transfer.

As used herein, a vegetable includes those foods commonly classed as vegetables as well as those commonly classed as fruits.

The terms "refrigerated air" or "refrigerated plate" refer to a degree of temperature reduction sufficient to effect freezing of the food. Otherwise the term would be too broad, and would only mean that the plate or air had been reduced in temperature without reference to any point to which the reduction was carried. This restricted meaning is a common usage of the term.

Having thus described my invention, I claim:

1. The process of freezing food, comprising: placing pieces of a food in a single layer, while maintaining the single layer, agitating the food so that each individual piece moves continuously and independently of the others, and while so agitating the food subjecting it to a temperature below the freezing point of the food.

2. The process of freezing food, comprising: placing pieces of a food in a single layer, while maintaining the single layer, agitating the food so that each individual piece moves continuously and independently of the others, and while so agitating the food subjecting it to a current of air at a temperature below the freezing point of the food.

3. The process of glazing food, comprising: reducing the temperature of a food to a point where a glazing material will be solidified by such temperature, insuring the presence of such a glazing material upon the surface of the food, and agitating the food while the glaze is setting to insure the even distribution of the glaze over the surface of the food.

4. The process of glazing food, comprising: adding a glazing liquid to the surface of a food, agitating the food so that each individual piece moves independently of the others, and while so agitating the food subjecting it to a temperature below the freezing temperature of said liquid and to a vapor of the glazing liquid in the dry saturated region, whereby said glazing liquid will be evenly distributed and solidified upon the food.

5. The process of glazing food, comprising: subjecting a food to a medium at a temperature where a glazing material will be solidified, insuring the presence of such a glazing material upon the surface of the food, agitating the food to evenly distribute the glaze over the surface of the food, and during the period when the glaze is setting subjecting the food to a vapor of the glazing material in the dry saturated region.

6. The process of freezing food, comprising: adding water to the surface of a food; agitating the food; and while so agitating subjecting the food to a first medium at a temperature within a few degrees below freezing and to a water vapor in the dry saturated region until the water on the surface of the food is frozen, and then subjecting said food to a second medium at a much colder temperature than the first medium until the whole of the food is frozen.

7. The process of glazing food, comprising: subjecting a food to a medium at a temperature where a glazing material will be solidified, insuring the presence of such a glazing material upon the surface of the food, agitating the food to evenly distribute the glaze over the surface of the food, during the period when the glaze is setting subjecting the food to a vapor of the glazing material in the dry saturated region, and after the setting of the glaze further reducing the freezing temperature.

8. The process of freezing food, comprising: continuously cycling a gas across a refrigerated surface to reduce the temperature of the gas stream to slightly below 32° F. as it leaves said surface, and thru a prefreezing zone back to said surface; spraying said refrigerated surface with a brine of a concentration to prevent formation of ice on said surface and to cause said gas to contain water vapor in the dry saturated region; placing food in said prefreezing zone and removing it therefrom when only its surface is frozen; continuously cycling a gas thru a final freezing zone and into contact with a refrigerator to reduce the gas temperature much below 32° F. as it leaves said refrigerator; and placing said food in said final zone as it leaves said prefreezing zone, and removing it therefrom when it is completely frozen.

9. The process of freezing food, comprising: placing pieces of food in a flat layer of uniform depth, while maintaining such layer agitating the food so that each individual piece moves continuously, and while so agitating the food subjecting it to a medium whose temperature is below the freezing point of the food.

10. The process of freezing food, comprising: bringing into contact with a food a vapor of one of its constituents at a temperature slightly below the freezing point thereof and in the dry saturated region, until the surface of said food is frozen; and then subjecting said food to a gaseous medium which is at a temperature much below the surface temperature and the freezing point of said food until said food is completely frozen.

11. The process of freezing food, comprising: contacting a food with a stream of gas and water vapor at a temperature slightly below 32° F., said vapor being in the saturated region, until the surface of the food is frozen; and then subjecting the food to a gaseous medium which is at a temperature much below 32° F. and below the surface temperature of the food, until the food is completely frozen.

12. The process of freezing food, comprising: agitating the food; and while so agitating subjecting the food to a first medium at a temperature within a few degrees below the freezing point of the food and to a water vapor in the saturated region until the surface of the food is frozen; and then subjecting said food to a second medium which is at a temperature much below the freezing point of the food until the whole of the food is frozen.

13. The process of freezing food, comprising: continuously cycling a first gas across a refrigerated surface to reduce the temperature thereof, and through a first freezing zone back to said surface; placing food in said first freezing zone and removing it therefrom when partly frozen;

continuously cycling a second gas other than said first gas across a refrigerated surface to reduce the temperature of said second gas below that of said first gas, and through a second freezing zone back to said surface; and placing food from said first zone in said second zone for further freezing.

14. The process of freezing food, comprising: continuously cycling a first gas across a first refrigerated surface and through a first freezing zone back to said first surface; placing food in said first freezing zone and removing it therefrom when only partly frozen; continuously cycling a second gas other than said first gas across a second refrigerated surface other than said first surface and through a second freezing zone back to said second surface; and placing food from said first freezing zone in said second zone to further the freezing thereof.

15. The process of freezing food, comprising: continuously cycling a first gas across a first refrigerated surface to reduce the temperature thereof, and through a first freezing zone back to said first surface; placing food in said first freezing zone and removing it therefrom when partly frozen; continuously cycling a second gas other than said first gas across a second refrigerated surface other than said first surface to reduce the temperature of said second gas below that of said first gas, and through a second freezing zone back to said second surface; and placing food from said first zone in said second zone for further freezing.

16. The process of freezing food, comprising: continuously cycling a first gas across a first refrigerated surface to reduce the temperature of the gas to slightly below 32° F., and through a first freezing zone back to said first surface; placing a food in said first freezing zone and removing it therefrom when only partly frozen; continuously cycling a second gas other than said first gas across a second refrigerated surface other than said first surface to reduce the temperature of said second gas much below 32° F., and through a second freezing zone back to said second surface; and placing food from said first freezing zone in said second zone to further the freezing thereof.

FRANK W. KNOWLES.